United States Patent [19]

Rines et al.

[11] 4,287,852

[45] Sep. 8, 1981

[54] FISH GROWTH ACCELERATION AND DENSITY-INCREASING APPARATUS AND METHOD

[76] Inventors: Robert H. Rines, 13 Spaulding St., Concord, N.H. 03301; Albert Knowles, Westbrook, Moniack Bridge by Kirkhill, Scotland

[21] Appl. No.: 83,571

[22] Filed: Oct. 11, 1979

[51] Int. Cl.³ .............................................. A01K 61/00
[52] U.S. Cl. ....................................................... 119/3
[58] Field of Search .................................... 119/3, 2, 4

[56] References Cited

U.S. PATENT DOCUMENTS

| | | | |
|---|---|---|---|
| 3,572,291 | 3/1971 | Cavanagh | 119/3 |
| 3,698,359 | 10/1972 | Fremont | 119/3 |
| 3,704,687 | 12/1972 | Nohmura | 119/3 |
| 3,824,956 | 7/1974 | Presley | 119/3 |
| 3,870,018 | 3/1975 | Fruchtnicht | 119/3 |
| 4,036,176 | 7/1977 | McCarty et al. | 119/3 |

Primary Examiner—Hugh R. Chamblee
Attorney, Agent, or Firm—Rines and Rines, Shaprio and Shapiro

[57] ABSTRACT

This disclosure is concerned with novel, submersible cover designs for pools containing fish, such as salmonoids and the like, including vertically separated and stacked light-opaque covers that divide the pool into dark zones in which the fish are trained to rest in stacked formation with accelerated feeding habits and with a plurality of openings in the covers to provide a plurality of feed regions along the surfaces of the covers.

49 Claims, 1 Drawing Figure

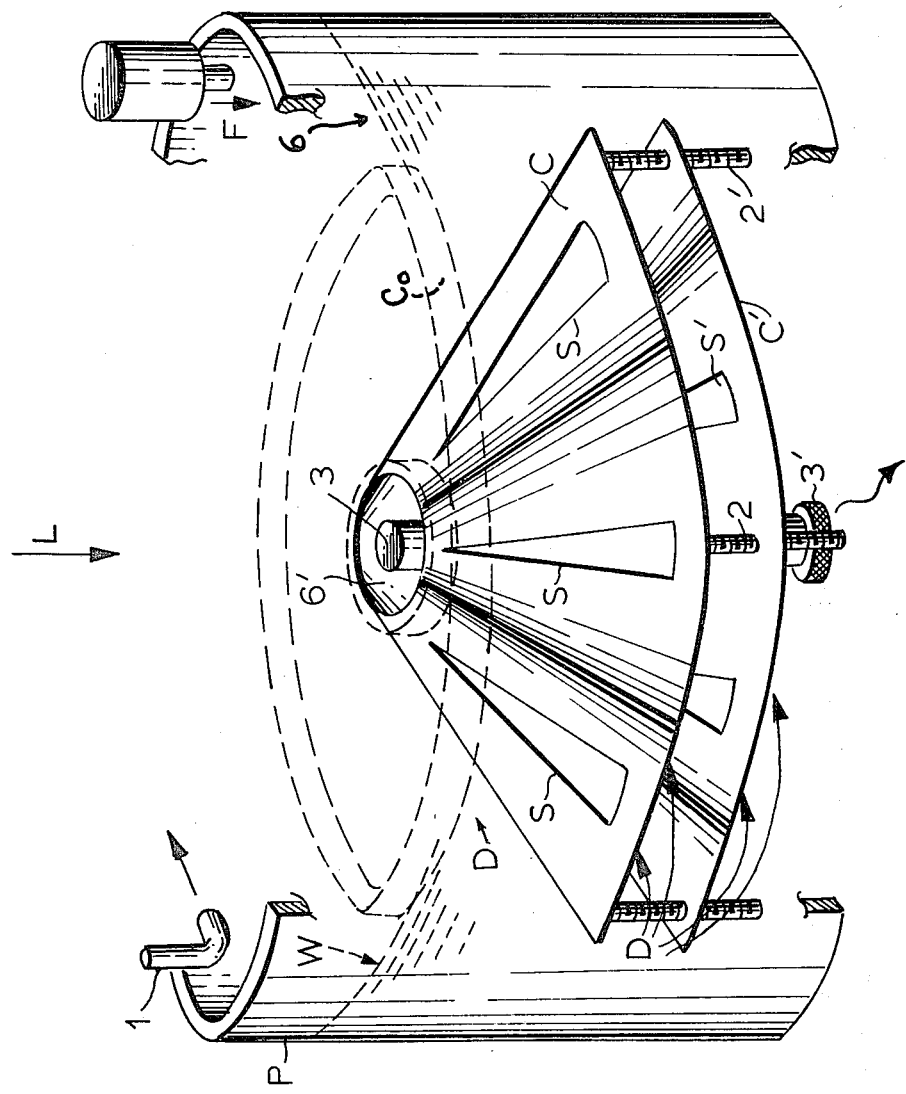

FISH GROWTH ACCELERATION AND DENSITY-INCREASING APPARATUS AND METHOD

The present invention relates to apparatus for and methods of accelerating the growth rate of fish, such as salmonoids and the like, (and wherein the term "fish", is generically employed to apply to all types of fish, eels, crustacia etc. exhibiting growth development characteristics as hereinafter described), being more particularly directed to the provision of novel dark resting zones and pluralities of intermediate feed zones in pools and the like (the term "pool" being generically employed herein to mean any volume of water having means for confining the fish therein, whether hard walls or nets or cages).

In copending United States patent application Ser. No. 065,617, filed Aug. 10, 1979, there is disclosed the discovery of the remarkable fish growth rate acceleration effect produced by blocking all light from a major portion of a pool, with illuminated feed regions external to the dark zones or areas provided by the blocking or shielding—such regions occupying either or both of peripherally surrounding regions or interior regions of the water-contacting light-opaque covers employed for the light blocking; and with preferred control of illumination of the feed regions beyond daylight hours in 24-hour cycles. Under such conditions, it has been found that the fish, such as salmon fry or parr, and later smolt developing therefrom and more mature fish, relax in columns in the dark zones, and dart into the illuminated feed regions for food at will, over a 24-hour or other extended period, without competition, disfiguring one another, or agitation, thereby resulting in startling acceleration of growth rate and increase of feasible densities of fish in the pond. As an example, in Scotland, with normal environmental water (not artificially heated) over a five-month period from May to September, salmon parr were found to have grown 25% more than similar parr in open or tent-covered ponds, during daylight illumination hours only, and 150% with 24-hour illumination of the feed regions; and that a doubling of the number of fish that could be accommodated in the pond could be safely attained. Acceleration of the period required to smolt has thus been effected, and growth rate acceleration of maturing salmon has also been observed to take place.

In accordance with the present invention, it has now been discovered that very much more significant improvement in increasing the useable densities of fish in ponds of predetermined size can be effected while obtaining such accelerated growth rate phenomena, with the aid of improved submersible cover designs and tiers of the same within the pool.

An object of the invention, accordingly, is to provide a new and improved apparatus for and method of salmonoid and other fish growth rate acceleration that significantly increase the densities of fish that may be simultaneously grown in pools.

A further object is to provide novel submersible covers and tiers of covers useful in such methods or processes.

Still another object is to provide a multiple-cover apparatus that can be used to train the fish to live and feed thereunder, so that if the apparatus is moved to other surroundings, the fish immediately adapt to the same in view of the familiar "home" provided by the covers.

Other and further objects will be explained hereinafter and are more particularly delineated in the appended claims. In summary, however, from one of its important aspects, the invention embraces a method of accelerating the growth of fish including salmonoids and the like, that comprises, stocking a pool of water with fish; circulating the water around the pool with feed; dividing the pool into a plurality of vertically spaced zones; blocking light impinging upon the pool from entering each of said zones to render the zones dark superposed rest areas wherein the fish rest in dense stacks; and transmitting light at predetermined unblocked regions of the pool to expose the feed in the water thereat to fish resting in said dark zones and able to view unblocked light-illuminated feed regions.

In another aspect, in summary, the invention provides apparatus for accelerating the growth of fish, including salmonoids and the like, within a pool of water containing the fish, comprising light-opaque cover means provided with means for supporting the same submerged within the pool; and the cover means having a plurality of open regions spaced along its surface intermediate light-opaque regions of the cover; said light-opaque regions producing dark zones within the pool underneath the same for the fish to rest in quiet, and with said open regions providing access to and visibility for feed immediately thereunder. And from still another viewpoint, the invention includes a method of training fish including salmonoids and the like to live in dense masses at spaced regions of a pool, that comprises, stocking a pool with such fish; submerging a tier of successively vertically spaced light-blocking covers in the pool to provide dark zones under the covers in which the fish may learn to rest in tight stacks; and illuminating from above feed regions of the pool outside the dark zones but laterally visible to the fish resting therein.

The invention will now be described with reference to the accompanying drawing, the single FIGURE of which is an isometric view of a preferred apparatus for practicing the method or process of the invention, with parts broken away to illustrate details of construction.

Referring to the drawing, a pool P is illustrated as provided with a water inlet 1, directed to inject water at an angle to the vertical to circulate the same about the pool, and with a central vertical exit tube 3, the open upper mouth of which is disposed at or just below the water level W of the pool, and the lower end of which is provided with an exit strainer 3'. The pool (hard-walled or net-confined) is stocked with fish, such as, for example, salmon parr. Fish feed is periodically dropped into the pool at F, as by a timed solenoid-operated shutter, as is well known, with the feed circulated around the pool by the moving water.

At the top of the pool, a light-opaque cover Co is shown preferably provided, as of the inverted cup type described in said copending application, contacting the water to provide a dark shadow area or zone thereunder over the major portion of the pool.

Taking further advantage of this light-blocking or shielding cover phenomenon before described, the present invention employs a submerged cover C of light-opaque material, illustrated as of generally circular contour, and specifically as of an inverted cup of frusto-conical shape, with the tube 3 passing axially through the center of the conical cup and its top central opening 6'. Where the cover Co is also used, it is usefully aligned with the cover C. The underwater cover C, extending also over a major portion of the cross-section of the pool, is supported by legs 2 and defines dark rest areas or zones D between the underside of the cover and below. Peripherally surrounding the cover C (and Co) is an uncovered annular region 6 which, like the central opening 6', is illuminated by light L transmitted from above the pool and renders the feed circulating therein clearly visible to the fish as they rest in the dark shadow zones D under the covers. As explained in said copending application, through control of the illumination after daylight hours, including up to 24-hours of continuous illumination, the fish have been found to feed more continually; and, in view of the dark zones D, rest therein after darting out for the feed, without agitation or hostile competition or mutual attack and disfigurement.

It has been discovered, however, that by providing along the surface of the cover C, a plurality of spaced narrow open regions, illustrated as transversely spaced slot openings S in the cover, each shown extending substantially radially along a directrix of the cone, and circumferentially spaced therealong, additional narrow feed zones are created external to and intermediate the much larger-area and wider dark or shadow zone regions that enable significantly improved density populations to be used; and, because of the geometry, keep the cover relatively clean in prolonged useage.

If the top cover Co is not used, the opaque cover C is the first cover to block the light from above and produce the dark regions, and the openings S will be additional illuminated feed regions. The width of the narrow slot openings S is preferably tapered, diverging towards the periphery of the cover C but terminating short thereof. With this construction, it has been observed that the feed circulated by the water inflow at 1 gradually sinks and rests on the upper surface of the cover C. The illuminated or unblocked slots or narrow regions S divide or border or are laterally external to the much larger light-blocking regions or segments of the cover and the dark zones formed thereunder. The circulating currents slowly move the feed around until it falls off the edges of the slot openings S and into illuminated view immediately thereunder to the fish resting quietly in the adjacent dark zones D (illuminated from L if the cover Co is not used, or visible as silhouette illumination looking laterally toward 6 or 6' if the cover Co is used). The fish then readily gobble the feed with little movement and without agitation or hostile competition, and re-position themselves in the dark rest zones D. Startlingly, this segmented slot construction has enabled, in some cases, at least a quadrupling of the density of fish that can be maintained in the pool, for a given pool size and width and oxygen flow rate, with the fish assuming an almost unbelievable solid stacked mass in the dark zones D.

Further to this end, it has been found that a tier of similar covers can be used to divide the pool into a plurality of vertically spaced dark zones. In the drawing, a second similar submerged cover C' is thus shown aligned below the cover C, with the upper surface of the cover C' supporting the legs 2 of the upper cover C, and the legs 2' of the lower cover C' supported on the pool bottom, thereby defining lower dark zones D in the space between the lower surface of the lower cover C' and the pool bottom. In land-based pools, simple resting of the legs 2, 2' may be sufficient; but the tier structure may be otherwise supported, with legs attachable to lower covers or otherwise unitarily fastened. Preferably, the slots S' in the lower cover C' are offset or staggered from those in the cover C, as shown in the drawing, for the feed efficiency purposes later explained; and the closely packed, vastly increased fish mass density in the sets of dark zones D under each cover thus greatly increases the effective fish production feasible in the pool—all with the before-described accelerated growth phenomena. A significant saving of feed that would otherwise drop to the bottom and be lost is attained by such off-setting or staggering of the slots S, S' of successive submerged covers C, C', etc., since feed that is not eaten in dropping through a slot S will then fall on the surface of the lower cover, and then gradually be circulated to a slot S' for exposure to the fish below cover C'; and so on for further covers in the tier employed.

In the case of salmon parr in a fresh water pool of about 2.5 meters in diameter and volume of 45 cubic feet and water flow rate of 10 gallons/min., covers as above described were found to enable a parr density of 2.25 lbs./ft.$^3$, as compared with the normal or customary density of 1.5 lbs./ft.$^3$, currently generally employed in such pools; with a growth rate of about 3 cm. per summer month, as compared with about 1.3 cm. per month with the submerged cover system of the invention; and with substantially zero disfigurement, as compared with about 25% in uncovered pools. While these results enable more rapid and greater volume of smolt production, the acceleration phenomenon of the invention has also been found to continue in the salt-water maturing of the salmon, as well.

The invention also has particular application where fish, such as salmon parr and the like, are ultimately to be placed in relatively large volumes, as in pools defined by nets in salt water, sometimes called sea cages, for maturation after reaching the smolt state in fresh water walled pools. Apart from the important increased density feasible with accelerated growth in the fresh water pools, it has been found that the tiered vertically spaced submerged covers, particularly if first used in the smolting pools, will accustom or train the fish to live primarily in the dark zones in closely packed stacks and with contentment, feeding continually without hostility at the slot openings and at the illuminated regions beyond the borders of the opaque portions of the cover. When smolting has occurred, accordingly, and it is time to transfer the fish to much larger maturation pools, such as large net-confined volumes in the sea or even large land-based pools, by transferring the tiered-cover "home" (or a similar one) to the larger pools (including cages within the term "pool" as before explained), the new surroundings do not appear "new". The fish acclimate immediately and continue their rapid growth and heavy density tendencies under the familiar submerged covers, improving the efficiency of their maturing process in the larger maturation pools. The feed-efficient staggered slot arrangement in successive covers, moreover, is particularly desirable in net-confined sea pools or cages where much feed is lost by natural circulation out of and dropping through the nets.

While the invention has been described with reference to a preferred circular frusto-conical configuration, clearly other geometrical contours may be employed, as may intermediate opening regions bordering or external to the dark regions of other than radial orientation; tiers of more than two submerged covers may also be used, and in some instances need not be in alignment; and the covers may, in certain applications, be only partly rather than totally submerged. The invention, moreover, is useful, as before mentioned, with other fish such as trout, eels and crustacea, exhibiting similar resting, feeding and growth characteristics and behavior; such and further modifications as will readily occur to those skilled in this art, being considered to fall within the spirit and scope of the invention as defined in the appended claims.

What is claimed is:

1. Apparatus for accelerating the growth of fish, including salmonoids and the like, within a pool of water containing the fish, comprising light-opaque cover means provided with means supporting the same submerged within the pool; the cover means having a plurality of open regions spaced along its surface intermediate light-opaque regions of the cover means; said light-opaque regions producing dark light-shielded zones within the pool underneath the same for the fish to rest in quiet, with said open regions providing access to and visibility for feed immediately thereunder; and means for promoting visual feeding by the fish under said open regions.

2. Apparatus as claimed in claim 1 and in which said open regions comprise slots through which feed may drop as the water is circulated in the pond.

3. Apparatus as claimed in claim 2 and in which said cover means is generally circular and said slots substantially radial.

4. Apparatus as claimed in claim 2 and in which the supporting means for the cover means maintains the same above the bottom of the pool.

5. Apparatus as claimed in claim 1 and in which said cover means is of inverted cup shape.

6. Apparatus as claimed in claim 5 and in which said cup shape is substantially of frusto-conical shape.

7. Apparatus as claimed in claim 6 and in which said open regions are narrow compared with the width of the light-opaque cover regions.

8. Apparatus as claimed in claim 7 and in which each of said slots tapers with increasing width substantially along a directrix of the cone.

9. Apparatus as claimed in claim 1 and in which said open regions are of areas small compared with that of the light-opaque cover regions.

10. Apparatus as claimed in claim 1 and in which a light-transmitting region is provided externally between the periphery of the cover means and the walls of the pool to expose feed therein.

11. Apparatus as claimed in claim 1 and in which the cover means is provided with a central light-transmitting open region within the cover means.

12. Apparatus as claimed in claim 1 and in which a light-opaque further cover is provided at the top surface of the pool.

13. Apparatus as claimed in claim 1 and in which at least one further similar cover means is disposed within the pool stacked at a region spaced above the first-named cover means to form a tier of cover means, with the further similar cover means producing further dark zones between the same and the first-named cover means.

14. Apparatus as claimed in claim 13 and in which the open regions of the further similar cover means are staggered with respect to such regions of the first-named cover means.

15. Apparatus as claimed in claim 13 and in which said stacked first-named and further cover means are of generally circular contour with their respective open regions extending substantially radially and staggered with respect to one another.

16. Apparatus as claimed in claim 15 and in which said open regions comprise slots.

17. Apparatus as claimed in claim 16 and in which said slots taper with increasing width toward the periphery of the cover means.

18. Apparatus as claimed in claim 15 and in which the cover means are substantially axially aligned.

19. Apparatus as claimed in claim 1 and in which the said cover means is partly submerged under the surface of the water in the pool.

20. Apparatus as claimed in claim 1 and in which a further light-opaque cover is provided at the top surface of the pool.

21. Apparatus as claimed in claim 1 and in which light is impinged on the surface of said pool beyond daylight hours.

22. Apparatus as claimed in claim 1 and in which the cover means occupies a major portion of the cross section of the pool.

23. Apparatus for accelerating the growth of fish, including salmonoids and the like, within a pool of water containing the fish, comprising a plurality of vertically spaced and stacked cover means of light-opaque material disposed within the pool and defining dark zones under each of the same for the fish to rest in quiet; light-transmitting regions of the pool not opaquely covered by the cover means; and means for promoting visual feeding by the fish in said light-transmitting regions.

24. Apparatus as claimed in claim 23 and in which said light-transmitting regions are at least one of within and external to the cover means.

25. Apparatus as claimed in claim 23 and in which a further light-opaque cover is provided at the top surface of the pool.

26. Apparatus as claimed in claim 23 and in which feed openings are provided in the cover means with the openings of adjacent cover means in the stack being staggered with respect to one another.

27. A method of accelerating the growth of fish including salmonoids and the like, that comprises, stocking a pool of water with fish; circulating the water around the pool with feed; dividing the pool into a plurality of vertically spaced zones; blocking light impinging upon the pool from entering each of said zones to render the zones dark superposed rest areas wherein the fish rest in dense stacks; and transmitting light at predetermined unblocked regions of the pool to expose the feed in the water thereat to fish resting in said dark zones and able to view unblocked light-illuminated feed regions.

28. A method as claimed in claim 27 and in which said unblocked regions are positioned at a plurality of locations within the blocked zones.

29. A method as claimed in claim 28 and in which said blocked zones are formed of generally circular contour and said unblocked regions are radial slots therein.

30. A method as claimed in claim 27 and in which said unblocked regions are positioned at the periphery of said zones between the same and the walls of the pool.

31. A method as claimed in claim 27 and in which the top surface of the pool is further blocked from light entering the same from above.

32. A method as claimed in claim 27 and in which light is transmitted towards said unblocked regions beyond daylight hours.

33. A method as claimed in claim 27 and in which said blocking of light is effected by submerging vertically spaced light-opaque covers in the pool to produce said dark zones thereunder.

34. A method as claimed in claim 33 and in which said unblocked regions are positioned at locations along the surfaces of the covers.

35. A method as claimed in claim 34 and in which the locations of the unblocked regions on the respective covers are staggered with respect to one another.

36. A method of accelerating the growth of fish including salmonoids and the like, that comprises, stocking a pool of water with fish; circulating the water around the pool with feed; submerging a light-blocking cover in the pool while providing a plurality of openings in the cover at a plurality of locations along the surface of the cover; and holding the cover in submerged position to provide dark zones under the light-blocking portions of the cover in which the fish may rest in stacks and view the feed in the regions under the said openings in the cover.

37. A method as claimed in claim 36 and in which the cover extends over a major portion of the pool and light-illumination of regions in the pool external to the periphery of the cover is effected.

38. A method as claimed in claim 36 and in which the cover is centrally provided with a further light-illuminated region.

39. A method as claimed in claim 38 and in which the water in the pool is exited from below said centrally provided region.

40. A method as claimed in claim 36 and in which light illuminates the pool beyond daylight hours.

41. A method as claimed in claim 36 and in which the said dark zones extend from the submerged cover to the bottom of the pool.

42. A method as claimed in claim 41 and in which the holding of the cover in submerged position is effected by supporting the cover spaced from but upon the bottom.

43. A method as claimed in claim 36 and in which said cover is contoured substantially circularly and said openings are formed substantially radially and distributed at a plurality of circumferentially spaced positions along the surface of the cover.

44. A method as claimed in claim 43 and in which the contouring of the cover is effected in substantially frusto-conical shape.

45. A method as claimed in claim 43 and in which said openings are tapered with increasing width in the direction from center to circumference of the cover.

46. A method of promoting fish growth that comprises densely populating a first pool with fish, the first pool comprising a volume of water contained within boundaries, circulating water through the first pool with feed, providing the pool with a light-blocking cover means forming thereunder at least one dark zone shielded from light, in which zone the fish can rest in darkness, illuminating a region of the first pool outside of the dark zone but laterally visible to the fish resting therein for enabling the fish to feed in said illuminated region, maintaining the fish in said first pool for a continued growth period sufficient to train the fish to adapt to the foregoing resting and feeding conditions, and thereafter transferring the fish to a second pool of water, as for maturation purposes and the like, said second pool being provided with light-blocking cover means forming thereunder at least one dark zone in like manner to the first pool, and allowing the fish to grow in the second pool in continuation of said foregoing conditions.

47. A method as defined in claim 46, wherein the cover means with which the first pool is provided comprises a tiered cover means of vertically spaced light-blocking covers forming successive vertically spaced dark zones in which the fish may rest in tight stacks.

48. A method as defined in claim 47, wherein the cover means includes feed openings in the cover in staggered relation from tier to tier.

49. A method as claimed in claim 46, wherein the first pool is a fresh-water pool and the second pool is a salt-water pool.

* * * * *